(12) United States Patent
Azami et al.

(10) Patent No.: US 9,711,825 B2
(45) Date of Patent: Jul. 18, 2017

(54) LITHIUM ION SECONDARY BATTERY

(71) Applicant: NEC Corporation, Tokyo (JP)

(72) Inventors: Takeshi Azami, Tokyo (JP); Noboru Yoshida, Tokyo (JP); Ikiko Shimanuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/771,898

(22) PCT Filed: Feb. 28, 2014

(86) PCT No.: PCT/JP2014/055175
§ 371 (c)(1),
(2) Date: Sep. 1, 2015

(87) PCT Pub. No.: WO2014/133165
PCT Pub. Date: Sep. 4, 2014

(65) Prior Publication Data
US 2016/0020492 A1 Jan. 21, 2016

(30) Foreign Application Priority Data
Mar. 1, 2013 (JP) .................. 2013-041324

(51) Int. Cl.
H01M 4/587 (2010.01)
H01M 10/0569 (2010.01)
H01M 10/0567 (2010.01)
H01M 4/133 (2010.01)
H01M 10/0525 (2010.01)
H01M 10/0568 (2010.01)
H01M 4/02 (2006.01)

(52) U.S. Cl.
CPC ....... *H01M 10/0569* (2013.01); *H01M 4/133* (2013.01); *H01M 4/587* (2013.01); *H01M 10/0525* (2013.01); *H01M 10/0567* (2013.01); *H01M 10/0568* (2013.01); *H01M 2004/027* (2013.01); *H01M 2300/0034* (2013.01); *Y02T 10/7011* (2013.01)

(58) Field of Classification Search
CPC ......... H01M 10/0567; H01M 10/0568; H01M 10/0569; H01M 4/583; H01M 4/587
See application file for complete search history.

(56) References Cited

U.S. PATENT DOCUMENTS

| | | | |
|---|---|---|---|
| 2004/0043300 A1 | 3/2004 | Utsugi et al. | |
| 2007/0111105 A1* | 5/2007 | Zaghib .................. | H01M 6/168 429/322 |
| 2007/0148546 A1 | 6/2007 | Shimizu et al. | |
| 2007/0154815 A1* | 7/2007 | Kawasaki ............. | H01M 4/131 429/340 |
| 2007/0218365 A1* | 9/2007 | Takezawa ........... | H01M 4/0421 429/231.95 |
| 2008/0268347 A1* | 10/2008 | Ohzuku ................ | H01M 4/505 429/322 |
| 2009/0123832 A1* | 5/2009 | Chigiri ................ | H01M 2/0275 429/163 |
| 2009/0325074 A1* | 12/2009 | Fukumoto ............. | H01M 2/166 429/231.95 |

(Continued)

FOREIGN PATENT DOCUMENTS

CN 102214826 A * 10/2011
EP 1394888 A1 3/2004
(Continued)

OTHER PUBLICATIONS

Machine translation of CN 102214826A, published on Oct. 12, 2011.*
International Search Report, Corresponding to PCT/JP2014/055175, dated Apr. 8, 2014, 1 page.
Office Action issued by the U.S. Patent and Trademark Office for U.S. Appl. No. 14/771,749 dated Jul. 11, 2016 (15 pages).
Office Action issued by the U.S. Patent and Trademark Office for U.S. Appl. No. 14/771,763 dated Jul. 7, 2016 (49 pages).
U.S. Office Action issued in corresponding U.S. Appl. No. 14/771,763, dated Nov. 21, 2016, 20 pages.

*Primary Examiner* — Anca Eoff
(74) *Attorney, Agent, or Firm* — Wilmer Cutler Pickering Hale and Dorr LLP

(57) ABSTRACT

A lithium ion secondary battery comprising a negative electrode comprising one or more types of carbon selected from the group consisting of natural graphite, artificial graphite, non-graphitizable carbon and easily graphitizable carbon; and an electrolyte solution comprising a cyclic sulfonic acid ester represented by the following formula (1):

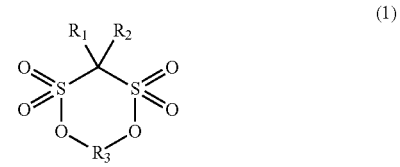

(1)

wherein in the formula (1), $R_1$ and $R_2$ are each independently a hydrogen atom, an alkyl group having 1 to 5 carbon atoms, a halogen group or an amino group with the proviso that $R_1$ and $R_2$ are not hydrogen atoms at the same time; $R_3$ represents a linkage group selected from the group consisting of an alkylene group having 1 to 5 carbon atoms, a carbonyl group, a sulfonyl group, a fluoroalkylene group having 1 to 6 carbon atoms, and a divalent group having 2 to 6 carbon atoms in which alkylene units or fluoroalkylene units are bonded through an ether group.

14 Claims, 1 Drawing Sheet

(56) References Cited

U.S. PATENT DOCUMENTS

| | | | | |
|---|---|---|---|---|
| 2010/0297501 A1* | 11/2010 | Seki | ................. | H01M 4/587 |
| | | | | 429/231.8 |
| 2011/0248719 A1* | 10/2011 | Aoki | ................. | H01M 10/482 |
| | | | | 324/426 |
| 2012/0255858 A1* | 10/2012 | Maeshima | ............. | C01B 31/08 |
| | | | | 204/294 |
| 2013/0011747 A1* | 1/2013 | Sasaki | ................. | C01B 31/02 |
| | | | | 429/336 |
| 2013/0029218 A1 | 1/2013 | Waki et al. | | |
| 2013/0059205 A1 | 3/2013 | Yamamura et al. | | |
| 2015/0349332 A1* | 12/2015 | Azami | ................. | H01M 4/133 |
| | | | | 429/188 |
| 2016/0028123 A1 | 1/2016 | Kawasaki et al. | | |

FOREIGN PATENT DOCUMENTS

| | | |
|---|---|---|
| EP | 2535974 A1 | 12/2012 |
| JP | 2004-281325 A | 10/2004 |
| JP | 2004-281368 A | 10/2004 |
| JP | 2005-222846 A | 8/2005 |
| JP | 2009-129747 A | 6/2009 |
| JP | 2010-062113 A | 3/2010 |
| JP | 4899341 B2 | 3/2012 |
| WO | WO-2011/096572 A1 | 8/2011 |
| WO | WO 2011/115247 * | 9/2011 |
| WO | WO-2011/118026 A1 | 9/2011 |

* cited by examiner

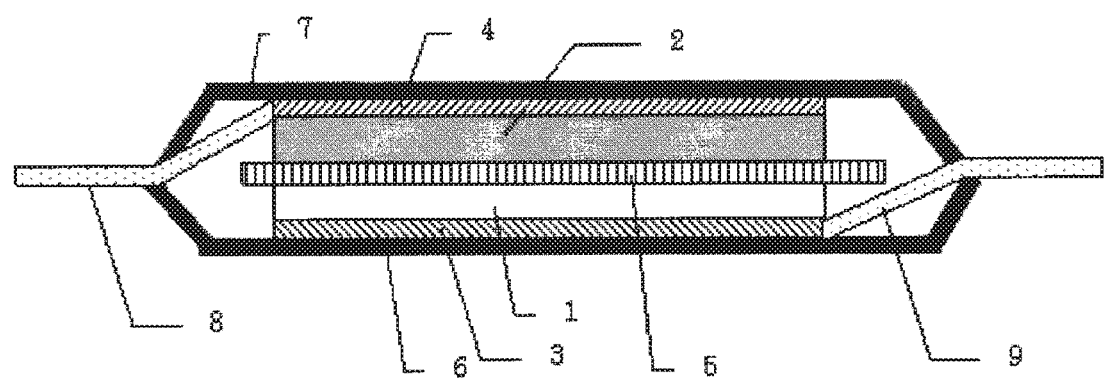

LITHIUM ION SECONDARY BATTERY

CROSS-REFERENCE TO RELATED APPLICATIONS

The present application is a national stage application of International Application No. PCT/JP2014/055175 entitled "Lithium Ion Secondary Battery," filed on Feb. 28, 2014, which claims the benefit of priority from Japanese Patent Application No. JP2013-041324, filed on Mar. 1, 2013, the disclosures of which are incorporated herein in their entirety by reference thereto.

TECHNICAL FIELD

The present invention relates to lithium ion secondary battery using a negative electrode comprising carbon and an electrolyte solution comprising an additive.

BACKGROUND ART

With rapid expansion of the markets of, for example, mobile tablet terminals, smartphones, electric vehicles and stationary power storage systems, secondary batteries which are safe, long in life time and high in energy density have been demanded. As candidates for such secondary batteries, a lithium ion secondary battery, which has high in energy density and free from the memory effect, is regarded as one of the promising secondary batteries. In particular, recently, attention has been paid to the so-called self-discharge property in which the charging capacity does not decrease even under standby condition in a charged state, as a key item to determine the degree of superiority or inferiority of a battery. Examples of the technique to achieve safe, long in life time and high in energy density lithium ion secondary batteries include: a method using a safe lithium-manganese composite oxide-based positive electrode, a method using a relatively inexpensive carbon-based negative electrode, and a method using a nonaqueous electrolyte solution excellent in stability. In particular, a technique using an excellent electrolyte solution and an excellent additive is important. The reasons for this are described below.

In the charge-discharge of a lithium ion secondary battery, the desorption and absorption reaction of lithium ions occurs in the interface between the electrode and the electrolyte solution. At this time, other than these reactions, decomposition reactions of an electrolyte solution solvent and a supporting electrolyte salt may take place in some cases. The decomposition reaction forms a high-resistance film on the electrode surface, and inhibits the desorption and absorption reactions of lithium ions, which should occur primarily. It is known that as a result, the irreversible decrease of the discharge capacity is progressed, and the properties as a secondary battery are degraded.

Various methods have been devised in order to suppress such a degradation. As one of such methods, there is mentioned a method in which the above-described decomposition reaction is suppressed by forming a protective film on the electrode surface; and as a technique for this purpose, there has been proposed addition of a cyclic disulfonic acid ester to the electrolyte solution as an additive to the electrolyte solution having film forming ability.

On the basis of what has been described above, a technique to suppress the degradation of the properties of a secondary battery, in particular, some techniques to improve the cycle characteristics and some techniques to suppress the internal resistance of a secondary battery during storage have been disclosed. Patent Literature 1, Patent Literature 2 and Patent Literature 3 disclose, as a method for suppressing the decomposition reaction of the electrolyte solution by forming a protective film on the electrode surface, a technique using an electrolyte solution of a secondary battery comprising a cyclic sulfonic acid ester having at least two sulfonyl groups, and a technique using a cyclic or linear disulfonic acid ester having an unsaturated bond.

Patent Literature 4 describes a lithium ion secondary battery having an electrolyte solution including a linear disulfonic acid ester and a cyclic disulfonic acid ester and having a negative electrode comprising one type of carbon material as a negative electrode active material. Patent Literature 5 describes a lithium ion secondary battery using amorphous carbon as the negative electrode active material and comprising an electrolyte solution comprising methylene methanedisulfonic acid ester. Patent Literature 6 describes a lithium ion secondary battery provided with an electrolyte solution including a cyclic sulfonic acid ester.

CITATION LIST

Patent Literature

Patent Literature 1: Japanese Patent Laid-Open No. 2004-281368
Patent Literature 2: Japanese Patent Laid-Open No. 2005-222846
Patent Literature 3: Japanese Patent Laid-Open No. 2004-281325
Patent Literature 4: Japanese Patent No. 4899341
Patent Literature 5: Japanese Patent Laid-Open No. 2009-129747
Patent Literature 6: Japanese Patent Laid-Open No. 2010-062113

SUMMARY OF INVENTION

Technical Problem

However, when an electrolyte solution comprising an unsubstituted disulfonic acid ester is stored, it undergoes degradations such as the coloration of the electrolyte solution, the occurrence of sediments in the electrolyte solution and the increase of the free acid concentration; when such a degraded electrolyte solution is used, there is a problem of the effect on the battery properties such as capacity degradation and storage characteristics, in particular, the degradation of the residual capacity associated with the self-discharge. When the unsubstituted disulfonic acid ester is used, the liquid injection nozzle is clogged during the production of a battery due to the occurrence of the sediments, causing a problem that the production yield is low.

Moreover, the investigation of the improvement for a lithium ion secondary battery is still insufficient in the case where the lithium ion secondary battery comprises a specific carbon negative electrode.

Accordingly, an object of the present invention is to provide a lithium ion secondary battery being excellent in the storage characteristics, in particular, being suppressed in the capacity decrease due to the self-discharge.

Solution to Problem

An embodiment of the present invention relates to a lithium ion secondary battery having a negative electrode comprising a negative electrode active material comprising at least one or more types of carbon selected from the group consisting of natural graphite, artificial graphite, non-graphitizable carbon and easily graphitizable carbon, and having an electrolyte solution comprising a cyclic sulfonic acid ester represented by the following formula (1);

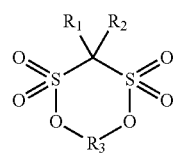
(1)

wherein, in the formula (1), $R_1$ and $R_2$ are each independently a hydrogen atom, an alkyl group having 1 to 5 carbon atoms, a halogen group or an amino group, with the proviso that $R_1$ and $R_2$ are not hydrogen atoms at the same time; $R_3$ represents a linkage group selected from the group consisting of an alkylene group having 1 to 5 carbon atoms, a carbonyl group, a sulfonyl group, a fluoroalkylene group having 1 to 6 carbon atoms, and a divalent group having 2 to 6 carbon atoms in which alkylene units or fluoroalkylene units are bonded through an ether group.

Advantageous Effects of Invention

According to the present invention, it is possible to provide a lithium ion secondary battery being excellent in the storage characteristics, in particular, being suppressed in the capacity decrease due to the self-discharge.

BRIEF DESCRIPTION OF DRAWING

The FIGURE is a schematic structural diagram of the laminate outer package type structure of the nonaqueous electrolyte solution secondary battery of the present invention.

DESCRIPTION OF EMBODIMENT

According to the present invention, by comprising a compound represented by formula (1) in the electrolyte solution, the reactivity between the decomposition product of the supporting electrolyte salt and the disulfonic acid ester is reduced, and thus the generation of a free acid from the electrolyte solution can be suppressed. Moreover, the use of this compound reduces the resistance of the film formed on the negative electrode, and enables the formation of a strong conductive network in the negative electrode, and hence the decrease of the self-discharge rate as a battery can be improved.

Hereinafter, the present embodiment is described.

The constitution of the secondary battery using the nonaqueous electrolyte solution of the present invention is described with reference to the accompanying drawing. The FIGURE is an example of the schematic structural diagram of the secondary battery using the nonaqueous electrolyte solution of the present invention. The battery according to the present invention has, for example, a structure as shown the FIGURE. The positive electrode is formed by forming the layer 1 including a positive electrode active material as a film on the positive electrode current collector 3. The negative electrode is formed by forming the layer 2 including a negative electrode active material as a film on the negative electrode current collector 4. These positive electrode and negative electrode are disposed so as to face each other through the intermediary of the porous separator 5. The porous separator 5 is disposed so as to be nearly parallel to the layer 2 including the negative electrode active material. In the secondary battery of the present invention, an electrode element having these positive electrode and negative electrode disposed so as to face each other and the electrolyte solution are housed in the outer packages 6 and 7. Examples of the shape of the nonaqueous electrolyte solution secondary battery of the present embodiment include, without being particularly limited to: a laminate outer package type, a cylinder type, a square type and a coin type.

<Nonaqueous Electrolyte Solution>

The electrolyte solution (hereinafter, sometimes referred to as "a nonaqueous electrolyte solution" or, simply "an electrolyte solution") for lithium secondary batteries in the present embodiment includes as an additive, a cyclic sulfonic acid ester represented by the general formula (1) (hereinafter, sometimes simply referred to as "the compound of formula (1)");

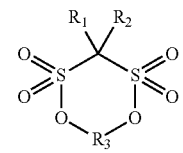
(1)

wherein, in the formula (1), $R_1$ and $R_2$ are each independently a hydrogen atom, an alkyl group having 1 to 5 carbon atoms, a halogen group or an amino group with the proviso that $R_1$ and $R_2$ are not hydrogen atoms at the same time; $R_3$ represents a linkage group selected from the group consisting of an alkylene group having 1 to 5 carbon atoms, a carbonyl group, a sulfonyl group, a fluoroalkylene group having 1 to 6 carbon atoms, and a divalent group having 2 to 6 carbon atoms in which alkylene units or fluoroalkylene units are bonded through an ether group.

The cyclic sulfonic acid ester represented by formula (1) included in the nonaqueous electrolyte solution is decomposed by the electrochemical redox reaction during charge-discharge reaction, and forms a film on the surface of the negative electrode active material, and accordingly can suppress the decomposition of the electrolyte solution and the supporting electrolyte salt. This is considered to be effective in prolonging the life time of the lithium ion secondary battery. The present inventors made a diligent study in more detail on the lithium ion secondary battery comprising nonaqueous electrolyte solution including the disulfonic acid ester compound. Consequently, it was found that the electrolyte solution including the compound of formula (1) has improved storage stability where the degradation is suppressed, and when the electrolyte solution was used, the capacity maintenance, and the storage characteristics, particularly the maintenance property of the residual capacity due to the self-discharge of the lithium ion secondary battery was drastically improved, and the present invention was thereby achieved.

In the present embodiment, the nonaqueous electrolyte solution includes as an additive a cyclic sulfonic acid ester represented by formula (1);

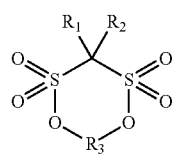

(1)

wherein, in the formula (1), $R_1$ and $R_2$ are each independently a hydrogen atom, an alkyl group having 1 to 5 carbon atoms, a halogen group or an amino group with the proviso that $R_1$ and $R_2$ are not hydrogen atoms at the same time; $R_3$ represents a linkage group selected from the group consisting of an alkylene group having 1 to 5 carbon atoms, a carbonyl group, a sulfonyl group, a fluoroalkylene group having 1 to 6 carbon atoms, and a divalent group having 2 to 6 carbon atoms in which alkylene units or fluoroalkylene units are bonded through an ether group.

Because at least one of $R_1$ and $R_2$ is substituted in the cyclic sulfonic acid ester represented by the general formula (1), the film forming ability for the film formed on the negative electrode surface is improved when the cyclic sulfonic acid ester is used as compared with the case of the sulfonic acid ester in which both of $R_1$ and $R_2$ are hydrogen atoms. Because at least one of $R_1$ and $R_2$ is substituted in the cyclic sulfonic acid ester represented by the general formula (1), the stability of the electrolyte solution is improved when the cyclic sulfonic acid ester is used as compared with the case of the sulfonic acid ester in which both of $R_1$ and $R_2$ are hydrogen atoms, and the lithium ion secondary battery using the above-described cyclic sulfonic acid ester is improved in the storage characteristics, in particular, in the maintainability of the residual capacity due to the self-discharge.

The present inventors infer the reasons for this as follows. By having a substituent(s) at a specific position(s) in the disulfonic acid ester, specifically by the condition that at least one of $R_1$ and $R_2$ in the general formula (1) is not a hydrogen atom, the reactivity between the decomposition product of the supporting electrolyte salt and the cyclic sulfonic acid ester is reduced, and thus, the generation of a free acid from the electrolyte solution can be suppressed. As shown in a below-described example, the above-described disulfonic acid ester has improved the stability of the electrolyte solution and the high temperature storage characteristics of the battery, as compared with a sulfonic acid ester in which both of $R_1$ and $R_2$ are hydrogen atoms.

A compound in which at least one of $R_1$ and $R_2$ in formula (1) is an alkyl group is preferable. In particular, a compound in which one of $R_1$ and $R_2$ is an alkyl group and both of $R_1$ and $R_2$ are alkyl groups is preferable. Among others, a compound in which one of $R_1$ and $R_2$ is an alkyl group and the other of $R_1$ and $R_2$ is a hydrogen atom is most preferable.

The reason for the fact that a compound in which one of $R_1$ and $R_2$ is an alkyl group and the other of $R_1$ and $R_2$ is a hydrogen atom is most preferable is described below. It is presumable that when at least one of $R_1$ and $R_2$ is not a hydrogen atom (namely, at least one of $R_1$ and $R_2$ is a substituent), the reactivity between the decomposition product of the supporting electrolyte salt and the cyclic sulfonic acid ester decreases, and the generation of a free acid from the electrolyte solution can be suppressed. However, it is considered that when it is not the case that at least one of $R_1$ and $R_2$ is a hydrogen atom (namely, both of $R_1$ and $R_2$ are substituents), the film forming ability for the film formed on the surface of the electrode active material is reduced as compared with the case where one of $R_1$ and $R_2$ is an alkyl group and the other of $R_1$ and $R_2$ is a hydrogen atom, and thus the effect of prolonging the life time of the lithium ion secondary battery is degraded.

Examples of the alkyl groups of $R_1$ and $R_2$ include methyl, ethyl, propyl, butyl and pentyl. These may be either linear or branched. In particular, methyl, ethyl and propyl are preferable, and methyl and ethyl are more preferable. Example of the halogens of $R_1$ and $R_2$ include fluorine, chlorine, bromine and iodine, and fluorine is preferable among these.

$R_3$ represents a linkage group selected from the group consisting of an alkylene group having 1 to 5 carbon atoms, a carbonyl group, a sulfonyl group, a fluoroalkylene group having 1 to 6 carbon atoms, and a divalent group having 2 to 6 carbon atoms in which alkylene units or fluoroalkylene units are bonded through an ether group. When the linkage group represented by $R_3$ is asymmetric, the orientation thereof is not limited.

In $R_3$ of formula (1), the alkylene group and the fluoroalkylene group may be either linear or branched, and are preferably linear. In the case of a linear alkylene group, the alkylene group is represented by $-(CH_2)_n-$ (n is an integer of 1 to 5), is more preferably a methylene group or an ethylene group being $-(CH_2)_n-$ (n is 1 or 2), and is furthermore preferably a methylene group represented by $-CH_2-$. In the branched alkylene group, at least one hydrogen atom of the alkylene group represented by $-(CH_2)_n-$ (n is an integer of 1 to 4) is substituted with an alkyl group; examples of the branched alkylene group include $-C(CH_3)_2-$, $-C(CH_3)(CH_2CH_3)-$, $-C(CH_2CH_3)_2-$, $-CH(C_mH_{2m+1})-$ (m is an integer of 1 to 4), $-CH_2-C(CH_3)_2-$, $-CH_2-CH(CH_3)-$, $CH(CH_3)-CH(CH_3)-$, $-CH(CH_3)CH_2CH_2-$ and $-CH(CH_3)CH_2CH_2CH_2-$; the branched alkylene group is preferably $-C(CH_3)_2-$ or $-CH(CH_3)-$, and is more preferably $-CH(CH_3)-$. The fluoroalkylene group means a group in which at least one of the hydrogen atoms in each of the foregoing alkylene groups is substituted with a fluorine; all the hydrogen atoms may be substituted with fluorine atoms, and the position and the number of the fluorine substitution are arbitrary. The fluoroalkylene group may either be linear or branched, and preferably linear. When all the hydrogen atoms are substituted with fluorine atoms in the linear fluoroalkylene group, $R_3$ is represented by $-(CF_2)_n-$ (n is an integer of 1 to 5). Specifically, preferable examples of the fluoroalkylene group include monofluoromethylene group, difluoromethylene group, monofluoroethylene group, difluoroethylene group, trifluoroethylene group and tetrafluoroethylene group.

Examples of "the divalent group having 2 to 6 carbon atoms in which alkylene units or fluoroalkylene units are bonded through an ether group" in $R_3$ of formula (1) include: $-R_4-O-R_6-$ ($R_4$ and $R_5$ each independently represent an alkylene group or a fluoroalkylene group, and the total number of carbon atoms of $R_4$ and $R_5$ is 2 to 6), and $-R_6-O-R_7-O-R_8-$ ($R_6$, $R_7$ and $R_8$ each independently represent an alkylene group or a fluoroalkylene group, and the total number of carbon atoms of $R_6$, $R_7$ and $R_8$ is 3 to 6). $R_4$ and $R_5$ may both be alkylene groups or fluoroalkylene groups, or one of $R_4$ and $R_5$ may be an alkylene group and the other may be a fluoroalkylene group. $R_6$, $R_7$ and $R_8$ may each independently be an alkylene group or a fluoroalkylene group. Examples thereof include: $-CH_2-O-CH_2-$, $-CH_2-O-C_2H_4-$, $-C_2H_4-O-C_2H_4-$, $-CH_2-O-CH_2-O-CH_2-$, $-CH_2-O-CHF-$, $-CH_2-O-CF_2-$, $-CF_2-O-CF_2-$, $-C_2F_4-O-C_2F_4-$, $-CF_2-O-CF_2-O-CF_2-$ and $-CH_2-O-CF_2-O-CH_2-$.

Among these, $R_3$ is preferably an alkylene group, a carbonyl group or a fluoroalkylene group, is more preferably an alkylene group or a fluoroalkylene group, and is furthermore preferably —$(CH_2)_n$— (n is 1 or 2), —$C(CH_3)_2$—, —$CH(CH_3)$—, a monofluoromethylene group, a difluoromethylene group, a monofluoroethylene group, a difluoroethylene group, trifluoroethylene group or a tetrafluoroethylene group.

Among these, $R_3$ is preferably —$CH_2$—, —$C(CH_3)_2$—, —$CH(CH_3)$—, —CHF— or —$CF_2$—, and more preferably —$CH_2$— or —$CF_2$—. The reasons for this are not clear; however, it is inferred that this is because when the compound represented by formula (1) is a compound having a six-membered ring structure, such a compound is high in the electrochemical reactivity for forming a film as compared with a compound having a seven-membered ring structure, and accordingly a film having a lower resistance, tougher and of a higher quality is formed. $R_3$ is particularly preferably a methylene group represented by —$CH_2$—.

Among the compounds represented by formula (1), the compounds represented by the following formula (1-1) are preferable, and the compounds represented by the following formula (2) or the following formula (3) are more preferable.

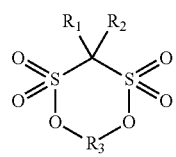

(1-1)

wherein, in the formula (1-1), $R_1$ and $R_2$ each independently represent a hydrogen atom, an alkyl group having 1 to 5 carbon atoms, a halogen atom or an amino group with the proviso that $R_1$ and $R_2$ are not hydrogen atoms at the same time; and $R_3$ is a methylene group which may be substituted with fluorine.

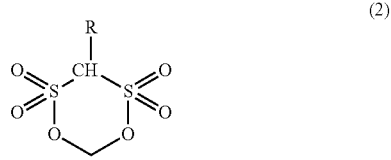

(2)

wherein, in the general formula (2), R represents methyl, ethyl, propyl, butyl or pentyl, and preferably represents methyl or ethyl.

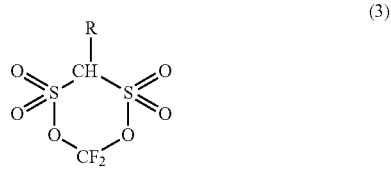

(3)

wherein, in the general formula (3), R represents methyl, ethyl, propyl, butyl or pentyl, and preferably represents methyl or ethyl.

Table 1 specifically shows typical examples of the compounds represented by the general formula (1), but the present invention is not limited to these.

TABLE 1

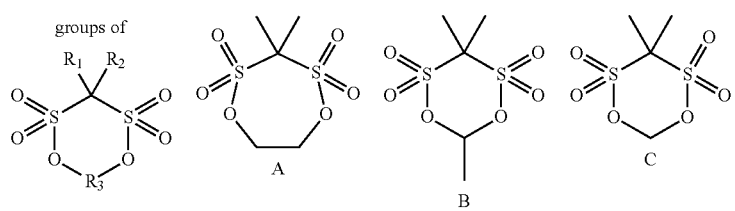

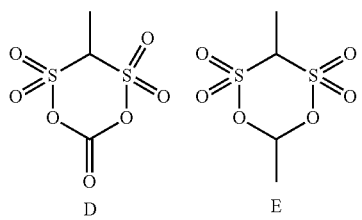

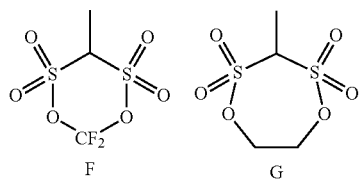

TABLE 1-continued

R₁ = Hydrogen atom
R₂ = $C_mH_{2m+1}$
 (n = 1, 2, 3),
R₃ = $CH_2$

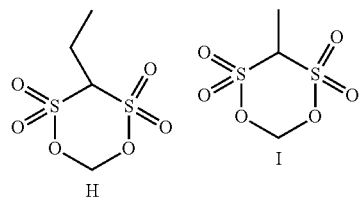

H      I

---

Examples of the preferable compounds of the formula (1) include the compounds in which in formula (1), $R_1$ is a methyl group or an ethyl group, $R_2$ is a hydrogen atom, $R_3$ is a methylene group or an ethylene group. Among these, the compounds in which in formula (1), $R_1$ is a methyl group or an ethyl group, $R_2$ is a hydrogen atom and $R_3$ is a methylene group are preferable, and the compound in which in formula (1), $R_1$ is a methyl group, $R_2$ is a hydrogen atom and $R_3$ is a methylene group is more preferable.

The compounds of the formula (1) may be used each alone or in combinations of two or more thereof.

The compounds of the general formula (1) can be obtained by using the production methods described in, for example, U.S. Pat. No. 4,905,0768, and Japanese Patent Laid-Open Nos. S61-501089, H05-44946 and 2005-336155.

The proportion of the compound represented by the formula (1) in the electrolyte solution is not particularly limited, but the compound is preferably included in a concentration of 0.005 to 10% by weight of the whole electrolyte solution. By setting the concentration of the compound represented by the general formula (1) to be 0.005% by weight or more, a filming with lower resistance can be obtained. The compound represented by the general formula (1) is more preferably added in a concentration of 0.01% by weight or more, and in this way, the battery properties can be further improved. By setting the concentration to be 10% by weight or less, the viscosity increase of the electrolyte solution and the resulting resistance increase can be suppressed. The compound is more preferably added in a concentration of 5% by weight or less, and in this way, the battery properties can further be improved.

As a nonaqueous electrolyte solution, it is possible to use, without being particularly limited to, for example, a solution obtained by adding the additive to a solution prepared by dissolving a lithium salt in a nonaqueous solvent.

Examples of the lithium salt include $LiPF_6$, lithium imide salt, $LiAsF_6$, $LiAlCl_4$, $LiClO_4$, $LiBF_4$ and $LiSbF_6$. Examples of the lithium imide salt include $LiN(C_kF_{2k+1}SO_2)(C_mF_{2m+1}SO_2)$ (k and m are each independently a natural number and are each preferably 1 or 2). These may be used each alone or in combinations of two or more thereof.

The concentration of the lithium salt in the nonaqueous electrolyte solution is preferably 0.7 mol/L or more and 2.0 mol/L or less. By setting the concentration of the lithium salt to be 0.7 mol/L or more, a sufficient ionic conductivity is obtained. Also by setting the concentration of the lithium salt to be 2.0 mol/L or less, the viscosity can be decreased, and accordingly the migration of lithium ions is not hindered.

As the nonaqueous solvent, at least one solvent selected from the group consisting of cyclic carbonates, linear carbonates, aliphatic carboxylic acid esters, γ-lactones, cyclic ethers and linear ethers can be used. Examples of the cyclic carbonates include propylene carbonate (PC), ethylene carbonate (EC), butylene carbonate (BC), and the derivatives (inclusive of fluorinated compounds) of these. Examples of the linear carbonates include dimethyl carbonate (DMC), diethyl carbonate (DEC), ethyl methyl carbonate (EMC), dipropyl carbonate (DPC), and the derivatives (inclusive of fluorinated compounds) of these. Examples of the aliphatic carboxylic acid esters include methyl formate, methyl acetate, ethyl propionate, and the derivatives (inclusive of fluorinated compounds) of these. Examples of the γ-lactones include γ-butyrolactone and the derivatives (inclusive of fluorinated compounds) of this. Examples of the cyclic ethers include tetrahydrofuran, 2-methyltetrahydrofuran and the derivatives (inclusive of fluorinated compounds) of these. Examples of the linear ethers include 1,2-diethoxyethane (DEE), ethoxymethoxyethane (EME), ethyl ether, diethyl ether, and the derivatives (inclusive of fluorinated compounds) of these. As the nonaqueous solvents, in addition to these, the following can also be used: dimethyl sulfoxide, 1,3-dioxolane, formamide, acetamide, dimethyl formamide, dioxolane, acetonitrile, propionitrile, nitromethane, ethyl monoglyme, phosphoric acid triester, trimethoxymethane, dioxolane derivatives, sulfolane, methylsulfolane, 1,3-dimethyl-2-imidazolidinone, 3-methyl-2-oxazolidinone, 1,3-propanesultone, anisole, N-methylpyrrolidone, and the derivatives (inclusive of fluorinated compounds) of these. These may be used each alone or in combinations of two or more thereof.

The electrolyte solution of the present embodiment can further include a compound having at least one sulfonyl group. Here, the compound having at least one sulfonyl group (hereinafter, also referred to as a sulfonyl group-containing compound) is a compound different from the cyclic sulfonic acid ester represented by the general formula (1). Some of the sulfonyl group-containing compounds may overlap with the foregoing nonaqueous solvents; however, the "sulfonyl group-containing compound" is usually used together with at least one nonaqueous solvent selected from the group consisting of cyclic carbonates, linear carbonates, aliphatic carboxylic acid esters, γ-lactones, cyclic ethers, linear ethers, and the fluorine derivatives of these compounds.

As the sulfonyl group-containing compound, the sultone compounds represented by the following general formula (4) are preferable:

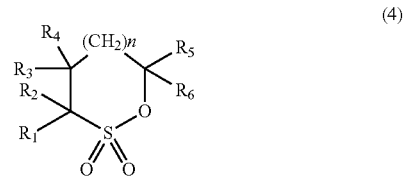

(4)

In the general formula (4), n represents an integer of 0 to 2, $R_1$ to $R_6$ each independently represent a hydrogen atom, an alkyl group having 1 to 12 carbon atoms, a cycloalkyl group having 3 to 6 carbon atoms, or an aryl group having 6 to 12 carbon atoms.

Examples of the compounds represented by the general formula (4) include cyclic sulfonic acid esters such as 1,3-propanesultone (PS), 1,4-butanesultone and 1,3-prop-2-enesultone.

The sulfonyl group-containing compound is used in a concentration of 0.005 to 10% by weight of the whole electrolyte solution.

The electrolyte solution of the present embodiment can further include vinylene carbonate or a derivative thereof. Examples of the vinylene carbonate or the derivative thereof may include: vinylene carbonates such as vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate and 4,5-diphenylvinylene carbonate; and vinylalkylene carbonates such as vinylethylene carbonate (VEC) and divinylethylene carbonate.

Vinylene carbonate or the derivative thereof is used in a concentration of 0.005 to 10% by weight of the whole electrolyte solution.

In the present embodiment, other additives other than the foregoing compounds can also be included in the electrolyte solution, if necessary. Examples of the other additives include an overcharge-preventing agent and a surfactant.

<Negative Electrode>

The negative electrode can be prepared by forming a negative electrode active material layer including a negative electrode active material and a negative electrode binder on a negative electrode current collector. In the nonaqueous electrolyte solution secondary battery of the FIGURE, for the negative electrode active material used for the layer 2 including a negative electrode active material, one or more materials selected from the group consisting of the carbon materials capable of absorbing/desorbing lithium such as natural graphite, artificial graphite, non-graphitizable carbon, and easily graphitizable carbon can be used; a mixture of two or more types of carbon is preferably used as the negative electrode active material. As compared with a case where only one type of carbon is used as the negative electrode active material, a case where two or more types of carbon are used is preferable because in this case, the impregnability of the electrolyte solution into the negative electrode active material layer, and moreover, the solution replacement property are improved. When two or more types of carbon are used as the negative electrode active material, it is possible to obtain a lithium ion secondary battery suppressed in the capacity decrease due to the self-discharge. In the types of carbon as the negative electrode active material, graphite is preferably included in a content of 20% by mass or more and more preferably included in a content of 60% by mass or more. Moreover, graphite and a silicon-based oxide may also be used as a mixture. In the present description, natural graphite, artificial graphite, non-graphitizable carbon and easily graphitizable carbon are sometimes referred to as the first carbon, second carbon, third carbon and fourth carbon, respectively.

In the present embodiment, as the carbon material as the negative electrode active material, it is possible to use the following materials capable of absorbing/desorbing lithium: natural graphite, artificial graphite, non-graphitizable carbon, easily graphitizable carbon, or composite oxides comprising these types of carbon and silicon. In particular, the graphite material (natural graphite or artificial graphite) is preferable because it has high electron conductivity, is excellent in the adhesiveness with the current collector made of a metal such as copper and in the voltage flatness, contains small amount of impurities because of being formed at a high processing temperature, and thus is advantageous for the improvement of the negative electrode performances.

In the present embodiment, the negative electrode active material preferably includes two or more types of carbon selected from at least two different groups of a group of natural graphite, a group of artificial graphite, a group of non-graphitizable carbon and a group of easily graphitizable carbon.

Examples of natural graphite include, without being particularly limited to its shape to: flake-like natural graphite, spherical natural graphite, massive natural graphite and amorphous natural graphite; among these, spherical natural graphite is preferable. Examples of artificial graphite include, without being particularly limited with respect to its shape to: massive artificial graphite, flake-like artificial graphite and spherical artificial graphite such as MCMB (mesophase micro beads); among these, massive artificial graphite is preferable. Examples of the shape of non-graphitizable carbon include, without being particularly limited with respect to its shape to: shapes such as massive shape, flake-like shape and flake-like shape; among these, the massive shape is preferable. Examples of easily graphitizable carbon include, without being particularly limited with respect to its shape to: shapes such as massive shape, flake-like shape and scale-like shape; among these, the flake-like shape is preferable.

In the present embodiment, the negative electrode active material preferably includes at least natural graphite and artificial graphite, natural graphite and non-graphitizable carbon, or artificial graphite and non-graphitizable carbon, more preferably includes natural graphite, artificial graphite and non-graphitizable carbon, and furthermore preferably includes natural graphite, artificial graphite, non-graphitizable carbon and easily graphitizable carbon. Moreover, in the present embodiment, it is preferable to use a combination of two or more types selected from spherical natural graphite, massive artificial graphite, massive non-graphitizable carbon and flake-like easily graphitizable carbon; particularly preferable is a combination of the negative electrode including the negative electrode active material prepared by mixing these and the electrolyte solution including the compound represented by formula I shown in Table 1.

Whether the shape of the carbon included in the negative electrode active material is spherical or massive can be verified by SEM (scanning electron microscope) observation.

In the SEM image of the negative electrode active material, the case where the ratio (minor axis)/(major axis) between the minor axis direction length (the length in the shortest length direction) and the major axis direction length (the length in the longest length direction) is larger than 0.2 can be determined to be a spherical shape or a massive shape. The (minor axis)/(major axis) of spherical graphite is preferably 0.3 or more and more preferably 0.5 or more.

Spherical graphite is produced from flake-like graphite as a starting material, and has a structure in which flake-like graphite is folded so as to have a spherical shape. Accordingly, schistosities are observed in spherical graphite, and has a cabbage-like exterior appearance in which schistosities are oriented in various directions. Voids are also observed in the fracture surface of spherical graphite. Because of including spherical graphite as the negative electrode active material, the orientation of the crystals takes various orientations after the rolling step during the preparation of the electrode, and accordingly the lithium ion migration between the electrodes is made to be performed smoothly. Moreover, by using spherical graphite, it is possible to obtain voids suitable for holding the electrolyte solution in the negative electrode active material, and hence it is possible to obtain a lithium secondary battery excellent in high output power property.

In massive graphite, such schistosities as observed in the spherical graphite are not observed, and massive graphite has a homogeneous shape.

The average particle size $D_{50m}$ of natural graphite is, but is not particularly limited to, preferably for example 5 to 80 μm; the average particle size $D_{50v}$ of massive artificial graphite or massive non-graphitizable carbon is preferably for example 5 to 40 μm.

The content of natural graphite in the negative electrode mixture (the total mass of the negative electrode active material, the negative electrode binder and the conductive material; the same applies hereinafter) may be 0% by mass, but is preferably 5 to 97% by mass and more preferably 10 to 70% by mass.

The content of artificial graphite in the negative electrode mixture may be 0% by mass, but is preferably 5 to 97% by mass and more preferably 10 to 70% by mass.

The content of non-graphitizable carbon in the negative electrode mixture may be 0% by mass, but is preferably 1 to 50% by mass and more preferably 3 to 30% by mass.

The content of easily graphitizable carbon in the negative electrode mixture may be 0% by mass, but is preferably 1 to 50% by mass and more preferably 3 to 30% by mass.

The mixing ratio of the two or more types of carbon included as the negative electrode active materials can be appropriately regulated. For example, when natural graphite and non-graphitizable carbon are used as a mixture, the mixing ratio of natural graphite:non-graphitizable carbon is preferably 10:90 to 90:10.

As the negative electrode binder, polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide and polyamideimide and the like can be used. The amount of the negative electrode binder to be used is preferably 0.5 to 20 parts by mass to 100 parts by mass of the negative electrode active material, from the viewpoint of sufficient binding strength and achievement of high energy being in a trade-off relation with each other. The above-described negative electrode binders little affect the battery performances when used singly, and hence can be used as mixtures thereof.

As the negative electrode current collector, aluminum, nickel, copper, silver, and alloys of these are preferable from the viewpoint of the electrochemical stability. Examples of the shape of the negative electrode current collector include foil, flat plate and mesh.

Examples of the method for forming the negative electrode active material layer include a doctor blade method, a die coater method, a CVD method and a sputtering method. The negative electrode current collector may also be formed by forming a thin film of aluminum, nickel or an alloy of these on the negative electrode active material layer by a method such as vapor deposition or sputtering after the negative electrode active material layer is formed beforehand.

<Positive Electrode>

In the secondary battery of the FIGURE, examples of the positive electrode active material used for the layer 1 comprising the positive electrode active material include lithium-containing composite oxides such as $LiCoO_2$, $LiNiO_2$ and $LiMn_2O_4$. The positive electrode active material may also be the compounds obtained by replacing the transition metal fractions in these lithium-containing composite oxides with other metals. Lithium-containing composite oxides having a plateau at 4.2 V or more at a metal lithium counter electrode potential can also be used. Examples of the lithium-containing composite oxides include spinel type lithium manganese composite oxides, olivine-type lithium-containing composite oxides and inverse spinel-type lithium-containing composite oxides. The lithium-containing composite oxides may be a compound represented by the following formula:

$$Li_a(M_xMn_{2-x})O_4$$

wherein, in the formula, 0<x<2 and 0<a<1.2; and M is at least one selected from the group consisting of Ni, Co, Fe, Cr and Cu.

The positive electrode can be obtained by dispersing and kneading these active materials together with carbon black and a binder such as polyvinylidene fluoride (PVdF) in a solvent such as N-methyl-2-pyrrolidone, and applying the resulting mixture to the positive electrode current collector such as aluminum foil.

As the positive electrode current collector, aluminum, nickel, silver, and alloys of these are preferable. Examples of the shape thereof include foil, flat plate and mesh.

<Method for Producing Secondary Battery>

As a method for producing a secondary battery, the method for producing the secondary battery of FIG. 1 is described as an example. In the preparation of the nonaqueous electrolyte solution of the FIGURE, in a dry air or inert gas atmosphere, a negative electrode and a positive electrode are laminated through the intermediary of the porous separator 5, and the thus obtained laminate, or the one obtained by winding the laminate is housed in a battery can or an outer package formed of, for example, a flexible film made of a laminate composed of a synthetic resin and a metal foil, and then a nonaqueous electrolyte solution including the compound of formula (1) as an additive is impregnated. An excellent film can be formed on the negative electrode by performing charging of the nonaqueous electrolyte solution secondary battery before or after the sealing of the outer package. As the porous separator 5, porous films of polyolefins such as polypropylene and polyethylene, fluororesins, and the like are used. As the outer package, any outer package can be appropriately selected as long as it is stable against the electrolyte solution and has a sufficient water vapor barrier property. For example, in the case of a layered laminate type secondary battery, a laminate film such as polypropylene and polyethylene coated with aluminum or silica can be used as the outer package. In particular, it is preferable to use an aluminum laminate film from the viewpoint of suppressing the volume expansion.

EXAMPLES

Hereinafter, the present embodiment is described more specifically by way of Examples; however, the present invention is not limited to these Examples.

Example 1

(Preparation of Lithium Ion Secondary Battery)

The preparation of the battery of the present Example 1 is described. As the positive electrode current collector, a 20 μm-thick aluminum foil was used, and as the positive electrode active material, $LiMn_2O_4$ was used. As the negative electrode current collector, a 10 μm-thick copper foil was used, on the copper foil, 95% by mass of spherical natural graphite A (average particle size $D_{50}$=20 μm) was used as the negative electrode active material. The average particle size was determined from the measurement of the volume-based particle size distribution with a particle size/particle size distribution measurement apparatus based on a laser diffraction-scattering method detecting the particle size from laser light scattering. Then, the negative electrode and the positive electrode are laminated on each other through the intermediary of a separator made of polyethylene, and thus, a secondary battery was prepared. In the production of the negative electrode, 2% by mass of a styrene-butadiene copolymer rubber (SBR) was used as a binder, 1.5% by mass of carboxymethyl cellulose (CMC) was used as a thickener, and 1.5% by mass of carbon black was used as a conductive material. In the production of the positive electrode, PVdF (KF Polymer, manufactured by Kureha Corp.) was used as a positive electrode binder, and acetylene black (manufactured by Timcal Graphite & Carbon, Inc.) was used as a conductivity imparting material.

(Preparation of Nonaqueous Electrolyte Solution)

As the solvent for the nonaqueous electrolyte solution, a mixed solvent (volume ratio: EC/DEC=30/70) of EC and DEC was used, and $LiPF_6$ was dissolved as a supporting electrolyte in the nonaqueous electrolyte solution so as for the concentration thereof to be 1 M.

As an additive, Compound A in Table 1 presented above was added in the nonaqueous electrolyte solution so as to be included in a concentration of 0.1 mol/L. A nonaqueous secondary battery was prepared by using this nonaqueous electrolyte solution, and the residual capacity test was performed.

(Residual Capacity Test)

First, at room temperature, charging and discharging were performed once. The conditions of this case were set, as demanded by the designed values, such that the CCCV charging rate was 1.0 C, the CC discharging rate was 1.0 C, the charging termination voltage was 4.2 V, and the discharging termination voltage was 2.5 V.

Subsequently, each of the batteries was charged at a CCCV charging rate of 1.0 C to a charging termination voltage of 4.2 V for 2.5 hours, and then allowed to stand in a thermostatic bath set at 45° C. for 4 weeks. After being allowed to stand, discharging was performed at a CC discharging rate of 1.0 C at room temperature, and the residual capacity was determined. The residual capacity ratio (%) was defined by 100×(residual capacity)/(charging capacity before being allowed to stand)(%). The results thus obtained are shown in Table 2. In Tables 2 to 7, the mixing proportions of the negative electrode active materials are the mass proportions of the respective negative electrode active materials (carbon) to the total mass of the negative electrode active material(s), the binder, the thickener and the conductive material.

Example 2

A secondary battery was prepared in the same manner as in Example 1 except that 95% by mass of the massive artificial graphite A (average particle size $D_{50}$=10 μm) was used as the negative electrode active material in place of the spherical natural graphite A (average particle size $D_{50}$=20 μm). Subsequently, the properties of the battery were examined in the same manner as in Example 1. The results thus obtained are shown in Table 2.

Example 3

A secondary battery was prepared in the same manner as in Example 1 except that 95% by mass of the massive non-graphitizable carbon A (average particle size $D_{50}$=9 μm) was used as the negative electrode active material in place of the spherical natural graphite A (average particle size $D_{50}$=20 μm). Subsequently, the properties of the battery were examined in the same manner as in Example 1. The results thus obtained are shown in Table 2.

Example 4

A secondary battery was prepared in the same manner as in Example 1 except that 95% by mass of the flake-like easily graphitizable carbon A (average particle size $D_{50}$=12 μm) was used as the negative electrode active material in place of the spherical natural graphite A (average particle size $D_{50}$=20 μm). Subsequently, the properties of the battery were examined in the same manner as in Example 1. The results thus obtained are shown in Table 2.

Example 5

A secondary battery was prepared in the same manner as in Example 1 except that 68% by mass of the spherical natural graphite A (average particle size $D_{50}$=20 μm), and 27% by mass of the massive artificial graphite A (average particle size $D_{50}$=10 μm) were used as the negative electrode active materials. Subsequently, the properties of the battery were examined in the same manner as in Example 1. The results thus obtained are shown in Table 2.

Example 6

A secondary battery was prepared in the same manner as in Example 1 except that 27% by mass of the spherical natural graphite A (average particle size $D_{50}$=20 μm), and 68% by mass of the massive artificial graphite A (average particle size $D_{50}$=10 μm) were used as the negative electrode active materials. Subsequently, the properties of the battery were examined in the same manner as in Example 1. The results thus obtained are shown in Table 2.

Example 7

A secondary battery was prepared in the same manner as in Example 1 except that 63% by mass of the spherical natural graphite A (average particle size $D_{50}$=20 μm), 22% by mass of the massive artificial graphite A (average particle size $D_{50}$=10 μm), and 10% by mass of the massive non-graphitizable carbon A (average particle size $D_{50}$=9 μm) were used as the negative electrode active materials. Subsequently, the properties of the battery were examined in the same manner as in Example 1. The results thus obtained are shown in Table 2.

Example 8

A secondary battery was prepared in the same manner as in Example 1 except that 22% by mass of the spherical natural graphite A (average particle size $D_{50}$=20 μm), 63% by mass of the massive artificial graphite A (average particle size $D_{50}$=10 μm), and 10% by mass of the massive non-graphitizable carbon A (average particle size $D_{50}$=9 μm) were used as the negative electrode active materials. Subsequently, the properties of the battery were examined in the same manner as in Example 1. The results thus obtained are shown in Table 2.

Example 9

A secondary battery was prepared in the same manner as in Example 1 except that 63% by mass of the spherical natural graphite A (average particle size $D_{50}$=20 μm), 22% by mass of the massive artificial graphite A (average particle size $D_{50}$=10 5% by mass of the massive non-graphitizable carbon A (average particle size $D_{50}$=9 μm), and 5% by mass of the flake-like easily graphitizable carbon A (average particle size $D_{50}$=12 μm) were used as the negative electrode active materials. Subsequently, the properties of the battery were examined in the same manner as in Example 1. The results thus obtained are shown in Table 2.

Example 10

A secondary battery was prepared in the same manner as in Example 1 except that 68% by mass of the massive artificial graphite A (average particle size $D_{50}$=10 μm), and 27% by mass of the massive non-graphitizable carbon A (average particle size $D_{50}$=9 μm) were used as the negative electrode active materials. Subsequently, the properties of the battery were examined in the same manner as in Example 1. The results thus obtained are shown in Table 2.

Example 11

A secondary battery was prepared in the same manner as in Example 1 except that 95% by mass of the spherical natural graphite A (average particle size $D_{50}$=20 μm) was used as the negative electrode active material, and Compound E, an additive shown in Table 1, was used in a concentration of 0.1 mol/L in the electrolyte solution. Subsequently, the properties of the battery were examined in the same manner as in Example 1. The results thus obtained are shown in Table 3.

Example 12

A secondary battery was prepared in the same manner as in Example 1 except that 95% by mass of the massive artificial graphite A (average $D_{50}$=10 μm) was used as the negative electrode active material in place of the spherical natural graphite A (average particle size $D_{50}$=20 μm), and Compound E, an additive shown in Table 1, was used in a concentration of 0.1 mol/L in the electrolyte solution. Subsequently, the properties of the battery were examined in the same manner as in Example 1. The results thus obtained are shown in Table 3.

Example 13

A secondary battery was prepared in the same manner as in Example 1 except that 95% by mass of the massive non-graphitizable carbon A (average particle size $D_{50}$=9 μm) was used as the negative electrode active material in place of the spherical natural graphite A (average particle size $D_{50}$=20 μm), and Compound E, an additive shown in Table 1, was used in a concentration of 0.1 mol/L. Subsequently, the properties of the battery were examined in the same manner as in Example 1. The results thus obtained are shown in Table 3.

Example 14

A secondary battery was prepared in the same manner as in Example 1 except that 95% by mass of the flake-like easily graphitizable carbon A (average particle size $D_{50}$=12 μm) was used as the negative electrode active material in place of the spherical natural graphite A (average particle size $D_{50}$=20 μm), and Compound E, an additive shown in Table 1, was used in a concentration of 0.1 mol/L. Subsequently, the properties of the battery were examined in the same manner as in Example 1. The results thus obtained are shown in Table 3.

Example 15

A secondary battery was prepared in the same manner as in Example 1 except that 68% by mass of the spherical natural graphite A (average particle size $D_{50}$=20 μm), and 27% by mass of the massive artificial graphite A (average particle size $D_{50}$=10 μm) were used as the negative electrode active materials, and Compound E, an additive shown in Table 1, was used in a concentration of 0.1 mol/L. Subsequently, the properties of the battery were examined in the same manner as in Example 1. The results thus obtained are shown in Table 3.

Example 16

A secondary battery was prepared in the same manner as in Example 1 except that 27% by mass of the spherical natural graphite A (average particle size $D_{50}$=20 μm), and 68% by mass of the massive artificial graphite A (average particle size $D_{50}$=10 μm) were used as the negative electrode active materials, and Compound E, an additive shown in Table 1, was used in a concentration of 0.1 mol/L. Subsequently, the properties of the battery were examined in the same manner as in Example 1. The results thus obtained are shown in Table 3.

Example 17

A secondary battery was prepared in the same manner as in Example 1 except that 63% by mass of the spherical natural graphite A (average particle size $D_{50}$=20 μm), 22% by mass of the massive artificial graphite A (average particle size $D_{50}$=10 μm), and 10% by mass of the massive non-graphitizable carbon A (average particle size $D_{50}$=9 μm) were used as the negative electrode active materials, and Compound E, an additive shown in Table 1, was used in a concentration of 0.1 mol/L in the electrolyte solution. Subsequently, the properties of the battery were examined in the same manner as in Example 1. The results thus obtained are shown in Table 3.

Example 18

A secondary battery was prepared in the same manner as in Example 1 except that 22% by mass of the spherical natural graphite A (average particle size $D_{50}$=20 μm), 63% by mass of the massive artificial graphite A (average particle size $D_{50}$=10 μm), and 10% by mass of the massive non-graphitizable carbon A (average particle size $D_{50}$=9 μm)

were used as the negative electrode active materials, and Compound E, an additive shown in Table 1, was used in a concentration of 0.1 mol/L. Subsequently, the properties of the battery were examined in the same manner as in Example 1. The results thus obtained are shown in Table 3.

Example 19

A secondary battery was prepared in the same manner as in Example 1 except that 63% by mass of the spherical natural graphite A (average particle size $D_{50}$=20 μm), 22% by mass of the massive artificial graphite A (average particle size $D_{50}$=10 μm), 5% by mass of the massive non-graphitizable carbon A (average particle size $D_{50}$=9 μm), and 5% by mass of the flake-like easily graphitizable carbon A (average particle size $D_{50}$=12 μm) were used as the negative electrode active materials, and Compound E, an additive shown in Table 1, was used in a concentration of 0.1 mol/L in the electrolyte solution. Subsequently, the properties of the battery were examined in the same manner as in Example 1. The results thus obtained are shown in Table 3.

Example 20

A secondary battery was prepared in the same manner as in Example 1 except that 68% by mass of the massive artificial graphite A (average particle size $D_{50}$=10 μm), and 27% by mass of the massive non-graphitizable carbon A (average particle size $D_{50}$=9 μm) were used as the negative electrode active materials, and Compound E, an additive shown in Table 1, was used in a concentration of 0.1 mol/L. Subsequently, the properties of the battery were examined in the same manner as in Example 1. The results thus obtained are shown in Table 3.

Example 21

A secondary battery was prepared in the same manner as in Example 1 except that 95% by mass of the spherical natural graphite A (average particle size $D_{50}$=20 μm) was used as the negative electrode active materials, and Compound G, an additive shown in Table 1, was used in a concentration of 0.1 mol/L. Subsequently, the properties of the battery were examined in the same manner as in Example 1. The results thus obtained are shown in Table 4.

Example 22

A secondary battery was prepared in the same manner as in Example 1 except that 95% by mass of the massive artificial graphite A (average particle size $D_{50}$=10 μm) was used as the negative electrode active material in place of the spherical natural graphite A (average particle size $D_{50}$=20 μm), and Compound G, an additive shown in Table 1, was used in a concentration of 0.1 mol/L. Subsequently, the properties of the battery were examined in the same manner as in Example 1. The results thus obtained are shown in Table 4.

Example 23

A secondary battery was prepared in the same manner as in Example 1 except that 95% by mass of the massive non-graphitizable carbon A (average particle size $D_{50}$=9 μm) was used as the negative electrode active material in place of, the spherical natural graphite A (average particle size $D_{50}$=20 μm), and Compound G, an additive shown in Table 1, was used in a concentration of 0.1 mol/L. Subsequently, the properties of the battery were examined in the same manner as in Example 1. The results thus obtained are shown in Table 4.

Example 24

A secondary battery was prepared in the same manner as in Example 1 except that 95% by mass of the flake-like easily graphitizable carbon A (average particle size $D_{50}$=12 μm) was used as the negative electrode active material in place of the spherical natural graphite A (average particle size $D_{50}$=20 μm), and Compound G, an additive shown in Table 1, was used in a concentration of 0.1 mol/L. Subsequently, the properties of the battery were examined in the same manner as in Example 1. The results thus obtained are shown in Table 4.

Example 25

A secondary battery was prepared in the same manner as in Example 1 except that 68% by mass of the spherical natural graphite A (average particle size $D_{50}$=20 μm), and 27% by mass of the massive artificial graphite A (average particle size $D_{50}$=10 μm) were used as the negative electrode active materials, and Compound G, an additive shown in Table 1, was used in a concentration of 0.1 mol/L. Subsequently, the properties of the battery were examined in the same manner as in Example 1. The results thus obtained are shown in Table 4.

Example 26

A secondary battery was prepared in the same manner as in Example 1 except that 27% by mass of the spherical natural graphite A (average particle size $D_{50}$=20 μm), and 68% by mass of the massive artificial graphite A (average particle size $D_{50}$=10 μm) were used as the negative electrode active materials, and Compound G, an additive shown in Table 1, was used in a concentration of 0.1 mol/L. Subsequently, the properties of the battery were examined in the same manner as in Example 1. The results thus obtained are shown in Table 4.

Example 27

A secondary battery was prepared in the same manner as in Example 1 except that 63% by mass of the spherical natural graphite A (average particle size $D_{50}$=20 μm), 22% by mass of the massive artificial graphite A (average particle size $D_{50}$=10 μm), and 10% by mass of the massive non-graphitizable carbon A (average particle size $D_{50}$=9 μm) were used as the negative electrode active materials, and Compound G, an additive shown in Table 1, was used in a concentration of 0.1 mol/L. Subsequently, the properties of the battery were examined in the same manner as in Example 1. The results thus obtained are shown in Table 4.

Example 28

A secondary battery was prepared in the same manner as in Example 1 except that 22% by mass of the spherical natural graphite A (average particle size $D_{50}$=20 μm), 63% mass of the massive artificial graphite A (average particle size $D_{50}$=10 μm), and 10% by mass of the massive non-graphitizable carbon A (average particle size $D_{50}$=9 μm) were used as the negative electrode active materials, and Compound G, an additive shown in Table 1, was used in a content of 2% by mass. Subsequently, the properties of the battery were examined in the same manner as in Example 1. The results thus obtained are shown in Table 4.

Example 29

A secondary battery was prepared in the same manner as in Example 1 except that 63% by mass of the spherical natural graphite A (average particle size $D_{50}$=20 µm), 22% by mass of the massive artificial graphite A (average particle size $D_{50}$=10 µm), 5% by mass of the massive non-graphitizable carbon A (average particle size $D_{50}$=9 µm), and 5% by mass of the flake-like easily graphitizable carbon A (average particle size $D_{50}$=12 µm) were used as the negative electrode active materials, and Compound G, an additive shown in Table 1, was used in a concentration of 0.1 mol/L. Subsequently, the properties of the battery were examined in the same manner as in Example 1. The results thus obtained are shown in Table 4.

Example 30

A secondary battery was prepared in the same manner as in Example 1 except that 68% by mass of the massive artificial graphite A (average particle size $D_{50}$=10 µm), and 27% by mass of the massive non-graphitizable carbon A (average particle size $D_{50}$=9 µm) were used as the negative electrode active materials, and Compound G, an additive shown in Table 1, was used in a concentration of 0.1 mol/L. Subsequently, the properties of the battery were examined in the same manner as in Example 1. The results thus obtained are shown in Table 4.

Example 31

A secondary battery was prepared in the same manner as in Example 1 except that 95% by mass of the spherical natural graphite A (average particle size $D_{50}$=20 µm) was used as the negative electrode active materials, and Compound H, an additive shown in Table 1, was used in a concentration of 0.1 mol/L. Subsequently, the properties of the battery were examined in the same manner as in Example 1. The results thus obtained are shown in Table 5.

Example 32

A secondary battery was prepared in the same manner as in Example 1 except that 95% by mass of the massive artificial graphite A (average particle size $D_{50}$=10 µm) was used as the negative electrode active material in place of the spherical natural graphite A (average particle size $D_{50}$=20 µm), and Compound H, an additive shown in Table 1, was used in a concentration of 0.1 mol/L. Subsequently, the properties of the battery were examined in the same manner as in Example 1. The results thus obtained are shown in Table 5.

Example 33

A secondary battery was prepared in the same manner as in Example 1 except that 95% by mass of the massive non-graphitizable carbon A (average particle size $D_{50}$=9 µm) was used as the negative electrode active material in place of the spherical natural graphite A (average particle size $D_{50}$=20 µm), and Compound H, an additive shown in Table 1, was used in a concentration of 0.1 mol/L. Subsequently, the properties of the battery were examined in the same manner as in Example 1. The results thus obtained are shown in Table 5.

Example 34

A secondary battery was prepared in the same manner as in Example 1 except that 95% by mass of the flake-like easily graphitizable carbon A (average particle size $D_{50}$=12 µm) was used as the negative electrode active material in place of the spherical natural graphite A (average particle size $D_{50}$=20 µm), and Compound H, an additive shown in Table 1, was used in a concentration of 0.1 mol/L. Subsequently, the properties of the battery were examined in the same manner as in Example 1. The results thus obtained are shown in Table 5.

Example 35

A secondary battery was prepared in the same manner as in Example 1 except that 68% by mass of the spherical natural graphite A (average particle size $D_{50}$=20 µm), and 27% by mass of the massive artificial graphite A (average particle size $D_{50}$=10 µm) were used as the negative electrode active materials, and Compound H, an additive shown in Table 1, was used in a concentration of 0.1 mol/L. Subsequently, the properties of the battery were examined in the same manner as in Example 1. The results thus obtained are shown in Table 5.

Example 36

A secondary battery was prepared in the same manner as in Example 1 except that 27% by mass of the spherical natural graphite A (average particle size $D_{50}$=20 µm), and 68% by mass of the massive artificial graphite A (average particle size $D_{50}$=10 µm) were used as the negative electrode active materials, and Compound H, an additive shown in Table 1, was used in a concentration of 0.1 mol/L. Subsequently, the properties of the battery were examined in the same manner as in Example 1. The results thus obtained are shown in Table 5.

Example 37

A secondary battery was prepared in the same manner as in Example 1 except that 63% by mass of the spherical natural graphite A (average particle size $D_{50}$=20 µm), 22% by mass of the massive artificial graphite A (average particle size $D_{50}$=10 µm), and 10% by mass of the massive non-graphitizable carbon A (average particle size $D_{50}$=9 µm) were used as the negative electrode active materials, and Compound H, an additive shown in Table 1, was used in a concentration of 0.1 mol/L. Subsequently, the properties of the battery were examined in the same manner as in Example 1. The results thus obtained are shown in Table 5.

Example 38

A secondary battery was prepared in the same manner as in Example 1 except that 22% by mass of the spherical natural graphite A (average particle size $D_{50}$=20 µm), 63% by mass of the massive artificial graphite A (average particle size $D_{50}$=10 µm), and 10% by mass of the massive non-graphitizable carbon A (average particle size $D_{50}$=9 µm) were used as the negative electrode active materials, and Compound H, an additive shown in Table 1, was used in a concentration of 0.1 mol/L. Subsequently, the properties of the battery were examined in the same manner as in Example 1. The results thus obtained are shown in Table 5.

Example 39

A secondary battery was prepared in the same manner as in Example 1 except that 63% by mass of the spherical natural graphite A (average particle size $D_{50}$=20 μm), 22% by mass of the massive artificial graphite A (average particle size $D_{50}$=10 μm), 5% by mass of the massive non-graphitizable carbon A (average particle size $D_{50}$=9 μm), and 5% by mass of the flake-like easily graphitizable carbon A (average particle size $D_{50}$=12 μm) were used as the negative electrode active materials, and Compound H, an additive shown in Table 1, was used in a concentration of 0.1 mol/L. Subsequently, the properties of the battery were examined in the same manner as in Example 1. The results thus obtained are shown in Table 5.

Example 40

A secondary battery was prepared in the same manner as in Example 1 except that 68% by mass of the massive artificial graphite A (average particle size $D_{50}$=10 μm), and 27% by mass of the massive non-graphitizable carbon A (average particle size $D_{50}$=9 μm) were used as the negative electrode active materials, and Compound H, an additive shown in Table 1, was used in a concentration of 0.1 mol/L. Subsequently, the properties of the battery were examined in the same manner as in Example 1. The results thus obtained are shown in Table 5.

Example 41

A secondary battery was prepared in the same manner as in Example 1 except that 95% by mass of the spherical natural graphite A (average particle size $D_{50}$=20 μm) was used as the negative electrode active materials, and Compound I, an additive shown in Table 1, was used in a concentration of 0.1 mol/L. Subsequently, the properties of the battery were examined in the same manner as in Example 1. The results thus obtained are shown in Table 6.

Example 42

A secondary battery was prepared in the same manner as in Example 1 except that 95% by mass of the massive artificial graphite A (average particle size $D_{50}$=10 μm) was used as the negative electrode active material in place of the spherical natural graphite A (average particle size $D_{50}$=20 μm), and Compound I, an additive shown in Table 1, was used in a concentration of 0.1 mol/L. Subsequently, the properties of the battery were examined in the same manner as in Example 1. The results thus obtained are shown in Table 6.

Example 43

A secondary battery was prepared in the same manner as in Example 1 except that 95% by mass of the massive non-graphitizable carbon A (average particle size $D_{50}$=9 μm) was used as the negative electrode active material in place of the spherical natural graphite A (average particle size $D_{50}$=20 μm), and Compound I, an additive shown in Table 1, was used in a concentration of 0.1 mol/L. Subsequently, the properties of the battery were examined in the same manner as in Example 1. The results thus obtained are shown in Table 6.

Example 44

A secondary battery was prepared in the same manner as in Example 1 except that 95% by mass of the flake-like easily graphitizable carbon A (average particle size $D_{50}$=12 μm) was used as the negative electrode active material in place of the spherical natural graphite A (average particle size $D_{50}$=20 and Compound I, an additive shown in Table 1, was used in a concentration of 0.1 mol/L. Subsequently, the properties of the battery were examined in the same manner as in Example 1. The results thus obtained are shown in Table 6.

Example 45

A secondary battery was prepared in the same manner as in Example 1 except that 68% by mass of the spherical natural graphite A (average particle size $D_{50}$=20 μm), and 27% by mass of the massive artificial graphite A (average particle size $D_{50}$=10 μm) were used as the negative electrode active materials, and Compound I, an additive shown in Table 1, was used in a concentration of 0.1 mol/L. Subsequently, the properties of the battery were examined in the same manner as in Example 1. The results thus obtained are shown in Table 6.

Example 46

A secondary battery was prepared in the same manner as in Example 1 except that 27% by mass of the spherical natural graphite A (average particle size $D_{50}$=20 μm), and 68% by mass of the massive artificial graphite A (average particle size $D_{50}$=10 μm) were used as the negative electrode active materials, and Compound I, an additive shown in Table 1, was used in a concentration of 0.1 mol/L. Subsequently, the properties of the battery were examined in the same manner as in Example 1. The results thus obtained are shown in Table 6.

Example 47

A secondary battery was prepared in the same manner as in Example 1 except that 63% by mass of the spherical natural graphite A (average particle size $D_{50}$=20 μm), 22% by mass of the massive artificial graphite A (average particle size $D_{50}$=10 μm), and 10% by mass of the massive non-graphitizable carbon A (average particle size $D_{50}$=9 μm) were used as the negative electrode active materials, and Compound I, an additive shown in Table 1, was used in a concentration of 0.1 mol/L. Subsequently, the properties of the battery were examined in the same manner as in Example 1. The results thus obtained are shown in Table 6.

Example 48

A secondary battery was prepared in the same manner as in Example 1 except that 22% by mass of the spherical natural graphite A (average particle size $D_{50}$=20 μm), 63% by mass of the massive artificial graphite A (average particle size $D_{50}$=10 μm), and 10% by mass of the massive non-graphitizable carbon A (average particle size $D_{50}$=9 μm) were used as the negative electrode active materials, and Compound I, an additive shown in Table 1, was used in a concentration of 0.1 mol/L. Subsequently, the properties of the battery were examined in the same manner as in Example 1. The results thus obtained are shown in Table 6.

Example 49

A secondary battery was prepared in the same manner as in Example 1 except that 63% by mass of the spherical natural graphite A (average particle size $D_{50}$=20 µm), 22% by mass of the massive artificial graphite A (average particle size $D_{50}$=10 µm), 5% by mass of the massive non-graphitizable carbon A (average particle size $D_{50}$=9 µm), and 5% by mass of the flake-like easily graphitizable carbon A (average particle size $D_{50}$=12 µm) were used as the negative electrode active materials, and Compound I, an additive shown in Table 1, was used in a concentration of 0.1 mol/L. Subsequently, the properties of the battery were examined in the same manner as in Example 1. The results thus obtained are shown in Table 6.

Example 50

A secondary battery was prepared in the same manner as in Example 1 except that 68% by mass of the massive artificial graphite A (average particle size $D_{50}$=10 µm), and 27% by mass of the massive non-graphitizable carbon A (average particle size $D_{50}$=9 µm) were used as the negative electrode active materials, and Compound I, an additive shown in Table 1, was used in a concentration of 0.1 mol/L. Subsequently, the properties of the battery were examined in the same manner as in Example 1. The results thus obtained are shown in Table 6.

Comparative Example 1

A secondary battery was prepared in the same manner as in Example 1 except that methylene methanedisulfonic acid ester was used in place of Compound A in Example 1, and the properties of the battery were measured in the same manner as in Example 1. The results thus obtained are shown in Table 7.

Comparative Example 2

A secondary battery was prepared in the same manner as in Example 2 except that methylene methanedisulfonic acid ester was used in place of Compound A in Example 2, and the properties of the battery were measured in the same manner as in Example 1. The results thus obtained are shown in Table 7.

Comparative Example 3

A secondary battery was prepared in the same manner as in Example 3 except that methylene methanedisulfonic acid ester was used in place of Compound A in Example 3, and the properties of the battery were measured in the same manner as in Example 1. The results thus obtained are shown in Table 7.

Comparative Example 4

A secondary battery was prepared in the same manner as in Example 4 except that methylene methanedisulfonic acid ester was used in place of Compound A in Example 4, and the properties of the battery were measured in the same manner as in Example 1. The results thus obtained are shown in Table 7.

Comparative Example 5

A secondary battery was prepared in the same manner as in Example 5 except that methylene methanedisulfonic acid ester was used in place of Compound A in Example 5, and the properties of the battery were measured in the same manner as in Example 1. The results thus obtained are shown in Table 7.

Comparative Example 6

A secondary battery was prepared in the same manner as in Example 6 except that methylene methanedisulfonic acid ester was used in place of Compound A in Example 6, and the properties of the battery were measured in the same manner as in Example 1. The results thus obtained are shown in Table 7.

Comparative Example 7

A secondary battery was prepared in the same manner as in Example 7 except that methylene methanedisulfonic acid ester was used in place of Compound A in Example 7, and the properties of the battery were measured in the same manner as in Example 1. The results thus obtained are shown in Table 7.

Comparative Example 8

A secondary battery was prepared in the same manner as in Example 9 except that methylene methanedisulfonic acid ester was used in place of Compound A in Example 9, and the properties of the battery were measured in the same manner as in Example 1. The results thus obtained are shown in Table 7.

Comparative Example 9

Lithium titanate was used for the negative electrode, and "Compound A" shown in Table 1, was used in Example 1. Otherwise in the same manner as in Example 1, a secondary battery was prepared. Subsequently, the residual capacity properties of the battery were examined in the same manner as in Example 1. The results thus obtained are shown in Table 7.

Comparative Example 10

Lithium titanate was used for the negative electrode, and "Compound E" shown in Table 1, was used in place of Compound A in Example 1. Otherwise in the same manner as in Example 1, a secondary battery was prepared. Subsequently, the residual capacity properties of the battery were examined in the same manner as in Example 1. The results thus obtained are shown in Table 7.

Comparative Example 11

Lithium titanate was used for the negative electrode, and "Compound G" shown in Table 1, was used in place of Compound A in Example 1. Otherwise in the same manner as in Example 1, a secondary battery was prepared. Subsequently, the residual capacity properties of the battery were examined in the same manner as in Example 1. The results thus obtained are shown in Table 7.

Comparative Example 12

Lithium titanate was used for the negative electrode, and "Compound H" shown in Table 1, was used in place of Compound A in Example 1. Otherwise in the same manner as in Example 1, a secondary battery was prepared. Subsequently, the residual capacity properties of the battery were examined in the same manner as in Example 1. The results thus obtained are shown in Table 7.

Comparative Example 13

Lithium titanate was used for the negative electrode, and "Compound I" shown in Table 1, was used in place of Compound A in Example 1. Otherwise in the same manner as in Example 1, a secondary battery was prepared. Subsequently, the residual capacity properties of the battery were examined in the same manner as in Example 1. The results thus obtained are shown in Table 7.

Comparative Example 14

Silicon was used for the negative electrode in place of the spherical natural graphite A in Example 1. Otherwise in the same manner as in Example 1, a secondary battery was prepared in the same manner as in Example 1. Subsequently, the residual capacity properties of the battery were examined in the same manner as in Example 1. The results thus obtained are shown in Table 7.

Comparative Example 15

Silicon was used in place of the spherical natural graphite A in Example 1, and "Compound E" shown in Table 1, was used in place of Compound A in Example 1. Otherwise in the same manner as in Example 1, a secondary battery was prepared. Subsequently, the residual capacity properties of the battery were examined in the same manner as in Example 1. The results thus obtained are shown in Table 7.

Comparative Example 16

Silicon was used in place of the spherical natural graphite A in Example 1, and "Compound G" shown in Table 1, was used in place of Compound A in Example 1. Otherwise in the same manner as in Example 1, a secondary battery was prepared. Subsequently, the residual capacity properties of the battery were examined in the same manner as in Example 1. The results thus obtained are shown in Table 7.

Comparative Example 17

Silicon was used in place of the spherical natural graphite A in Example 1, and "Compound H" shown in Table 1, was used in place of Compound A in Example 1. Otherwise in the same manner as in Example 1, a secondary battery was prepared. Subsequently, the residual capacity properties of the battery were examined in the same manner as in Example 1. The results thus obtained are shown in Table 7.

Comparative Example 18

Silicon was used in place of the spherical natural graphite A in Example 1, and "Compound I" shown in Table 1, was used in place of Compound A in Example 1. Otherwise in the same manner as in Example 1, a secondary battery was prepared. Subsequently, the residual capacity properties of the battery were examined in the same manner as in Example 1. The results thus obtained are shown in Table 7.

In each of Tables 2 to 7, the addition amount of the compound (additive) in the electrolyte solution is shown in mol/L. In each of Examples and Comparative Examples, the solvent used was EC/DEC=3/7 (volume ratio), and the supporting electrolyte salt used was $LiPF_6$ (concentration in electrolyte solution: 1 M).

Tables 2 to 7 show, for each of Examples and Comparative Examples, the type(s) of the negative electrode active material(s) used, the content(s) of the negative electrode active material(s), the type of the additive used, the content of the additive and the residual capacity ratio. The content of each of the negative electrode active materials represents the mass proportion in relation to the total amount of the negative electrode active material, the binder, the thickener, and the conductive material.

TABLE 2

| Sample | Negative electrode active materials | | | | Mixing proportions of negative electrode active materials | | | | Additive in electrolyte solution | | Residual capacity ratio (%) |
| | First carbon | Second carbon | Third carbon | Fourth carbon | First carbon (% by mass) | Second carbon (% by mass) | Third carbon (% by mass) | Fourth carbon (% by mass) | Compound type | Content in electrolyte solution (mol/L) | |
| --- | --- | --- | --- | --- | --- | --- | --- | --- | --- | --- | --- |
| Ex. 1 | Sp nat. gr. A | | | | 95 | | | | A | 0.1 | 76 |
| Ex. 2 | | Mas. art. gr. A | | | | 95 | | | A | 0.1 | 78 |
| Ex. 3 | | | Mas. non-gr. Cb. A | | | | 95 | | A | 0.1 | 75 |
| Ex. 4 | | | | Fl-like eas. gr. Cb A | | | | 95 | A | 0.1 | 74 |
| Ex. 5 | Sp nat. gr. A | Mas. art. gr. A | | | 68 | 27 | | | A | 0.1 | 81 |
| Ex. 6 | Sp nat. gr. A | Mas. art. gr. A | | | 27 | 68 | | | A | 0.1 | 81 |
| Ex. 7 | Sp nat. gr. A | Mas. art. gr. A | Mas. non-gr. Cb. A | | 63 | 22 | 10 | | A | 0.1 | 82 |
| Ex. 8 | Sp nat. gr. A | Mas. art. gr. A | Mas. non-gr. Cb. A | | 22 | 63 | 10 | | A | 0.1 | 82 |

TABLE 2-continued

| | Negative electrode active materials | | | | Mixing proportions of negative electrode active materials | | | | Additive in electrolyte solution | | Residual capacity ratio (%) |
|---|---|---|---|---|---|---|---|---|---|---|---|
| Sample | First carbon | Second carbon | Third carbon | Fourth carbon | First carbon (% by mass) | Second carbon (% by mass) | Third carbon (% by mass) | Fourth carbon (% by mass) | Compound type | Content in electrolyte solution (mol/L) | |
| Ex. 9 | Sp nat. gr. A | Mas. art. gr. A | Mas. non-gr. Cb. A | Fl-like eas. gr. Cb A | 63 | 22 | 5 | 5 | A | 0.1 | 83 |
| Ex. 10 | | Mas. art. gr. A | Mas. non-gr. Cb. A | | | 68 | 27 | | A | 0.1 | 81 |

Ex. = Example
Sp nat. gr. = Spherical natural graphite
Mas. art. gr. = Massive artificial graphite
Mas. non-gr. Cb. = Massive non-graphitizable carbon
Fl-like eas. gr. Cb = Flake-like easily graphitizable carbon

TABLE 3

| | Negative electrode active materials | | | | Mixing proportions of negative electrode active materials | | | | Additive in electrolyte solution | | Residual capacity ratio (%) |
|---|---|---|---|---|---|---|---|---|---|---|---|
| Sample | First carbon | Second carbon | Third carbon | Fourth carbon | First carbon (% by mass) | Second carbon (% by mass)) | Third carbon (% by mass) | Fourth carbon (% by mass) | Compound type | Content in electrolyte solution (mol/L) | |
| Ex. 11 | Sp nat. grA | | | | 95 | | | | E | 0.1 | 77 |
| Ex. 12 | | Mas. art. gr. A | | | | 95 | | | E | 0.1 | 79 |
| Ex. 13 | | | Mas. non-gr. Cb. A | | | | 95 | | E | 0.1 | 76 |
| Ex. 14 | | | | Fl-like eas. gr. Cb A | | | | 95 | E | 0.1 | 75 |
| Ex. 15 | Sp nat. gr. A | Mas. art. gr. A | | | 68 | 27 | | | E | 0.1 | 82 |
| Ex. 16 | Sp nat. gr. A | Mas. art. gr. A | | | 27 | 68 | | | E | 0.1 | 82 |
| Ex. 17 | Sp nat. gr. A | Mas. art. gr. A | Mas. non-gr. Cb. A | | 63 | 22 | 10 | | E | 0.1 | 83 |
| Ex. 18 | Sp nat. gr. A | Mas. art. gr. A | Mas. non-gr. Cb. A | | 22 | 63 | 10 | | E | 0.1 | 83 |
| Ex. 19 | Sp nat. gr. A | Mas. art. gr. A | Mas. non-gr. Cb. A | Fl-like eas. gr. Cb A | 63 | 22 | 5 | 5 | E | 0.1 | 84 |
| Ex. 20 | | Mas. art. gr. A | Mas. non-gr. Cb. A | | | 68 | 27 | | E | 0.1 | 82 |

Sp nat. gr = Spherical natural graphite
Mas. art. gr. = Massive artificial graphite
Mas. non-gr. Cb. = Massive non-graphitizable carbon
Fl-like eas. gr. Cb = Flake-like easily graphitizable carbon

TABLE 4

| | Negative electrode active materials | | | | Mixing proportions of negative electrode active materials | | | | Additive in electrolyte solution | | Residual capacity ratio (%) |
|---|---|---|---|---|---|---|---|---|---|---|---|
| Sample | First Carbon | Second Carbon | Third Carbon | Fourth Carbon | First carbon (% by mass) | Second carbon (% by mass) | Third carbon (% by mass) | Fourth carbon (% by mass) | Compound type | Content in electrolyte solution (mol/L) | |
| Ex. 21 | Sp nat. gr. A | | | | 95 | | | | G | 0.1 | 78 |
| Ex. 22 | | Mas. art. gr. A | | | | 95 | | | G | 0.1 | 80 |
| Ex. 23 | | | Mas. non-gr. Cb. A | | | | 95 | | G | 0.1 | 77 |
| Ex. 24 | | | | Fl-like eas. gr. Cb A | | | | 95 | G | 0.1 | 76 |

TABLE 4-continued

| | Negative electrode active materials | | | | Mixing proportions of negative electrode active materials | | | | Additive in electrolyte solution | | Residual capacity ratio (%) |
|---|---|---|---|---|---|---|---|---|---|---|---|
| Sample | First Carbon | Second Carbon | Third Carbon | Fourth Carbon | First carbon (% by mass) | Second carbon (% by mass) | Third carbon (% by mass) | Fourth carbon (% by mass) | Compound type | Content in electrolyte solution (mol/L) | |
| Ex. 25 | Sp nat. gr. A | Mas. art. gr. A | | | 68 | 27 | | | G | 0.1 | 83 |
| Ex. 26 | Sp nat. gr. A | Mas. art. gr. A | | | 27 | 68 | | | G | 0.1 | 83 |
| Ex. 27 | Sp nat. gr. A | Mas. art. gr. A | Mas. non-gr. Cb. A | | 63 | 22 | 10 | | G | 0.1 | 84 |
| Ex. 28 | Sp nat. gr. A | Mas. art. gr. A | Mas. non-gr. Cb. A | | 22 | 63 | 10 | | G | 0.1 | 84 |
| Ex. 29 | Sp nat. gr. A | Mas. art. gr. A | Mas. non-gr. Cb. A | Fl-like eas. gr. Cb A | 63 | 22 | 5 | 5 | G | 0.1 | 85 |
| Ex. 30 | | Mas. art. gr. A | Mas. non-gr. Cb. A | | | 68 | 27 | | G | 0.1 | 83 |

Ex. = Example
Sp nat. gr. = Spherical natural graphite
Mas. art. gr. = Massive artificial graphite
Mas. non-gr. Cb. = Massive non-graphitizable carbon
Fl-like eas. gr. Cb = Flake-like easily graphitizable carbon

TABLE 5

| | Negative electrode active materials | | | | Mixing proportions of negative electrode active materials | | | | Additive in electrolyte solution | | Residual capacity ratio (%) |
|---|---|---|---|---|---|---|---|---|---|---|---|
| Sample | First carbon | Second carbon | Third carbon | Fourth carbon | First carbon (% by mass) | Second carbon (% by mass) | Third carbon (% by mass) | Fourth carbon (% by mass) | Compound type | Content in electrolyte solution (mol/L) | |
| Ex. 31 | Sp nat. gr. A | | | | 95 | | | | H | 0.1 | 79 |
| Ex. 32 | | Mas. art. gr. A | | | | 95 | | | H | 0.1 | 81 |
| Ex. 33 | | | Mas. non-gr. Cb. A | | | | 95 | | H | 0.1 | 78 |
| Ex. 34 | | | | Fl-like eas. gr. Cb A | | | | 95 | H | 0.1 | 77 |
| Ex. 35 | Sp nat. gr. A | Mas. art. gr. A | | | 68 | 27 | | | H | 0.1 | 84 |
| Ex. 36 | Sp nat. gr. A | Mas. art. gr. A | | | 27 | 68 | | | H | 0.1 | 84 |
| Ex. 37 | Sp nat. gr. A | Mas. art. gr. A | Mas. non-gr. Cb. A | | 63 | 22 | 10 | | H | 0.1 | 85 |
| Ex. 38 | Sp nat. gr. A | Mas. art. gr. A | Mas. non-gr. Cb. A | | 22 | 63 | 10 | | H | 0.1 | 85 |
| Ex. 39 | Sp nat. gr. A | Mas. art. gr. A | Mas. non-gr. Cb. A | Fl-like eas. gr. Cb A | 63 | 22 | 5 | 5 | H | 0.1 | 86 |
| Ex. 40 | | Mas. art. gr. A | Mas. non-gr. Cb. A | | | 68 | 27 | | H | 0.1 | 84 |

Ex. = Example
Sp nat. gr. = Spherical natural graphite
Mas. art. gr. = Massive artificial graphite
Mas. non-gr. Cb. = Massive non-graphitizable carbon
Fl-like eas. gr. Cb = Flake-like easily graphitizable carbon

TABLE 6

| Sample | Negative electrode active materials | | | | Mixing proportions of negative electrode active materials | | | | Additive in electrolyte solution | | Residual capacity ratio (%) |
|---|---|---|---|---|---|---|---|---|---|---|---|
| | First carbon | Second carbon | Third carbon | Fourth carbon | First carbon (% by mass) | Second carbon (% by mass) | Third carbon (% by mass) | Fourth carbon (% by mass) | Compound type | Content in electrolyte solution (mol/L) | |
| Ex. 41 | Sp nat. gr. A | | | | 95 | | | | I | 0.1 | 80 |
| Ex. 42 | | Mas. art. gr. A | | | | 95 | | | I | 0.1 | 82 |
| Ex. 43 | | | Mas. non-gr. Cb. A | | | | 95 | | I | 0.1 | 79 |
| Ex. 44 | | | | Fl-like eas. gr. Cb A | | | | 95 | I | 0.1 | 78 |
| Ex. 45 | Sp nat. gr. A | Mas. art. gr. A | | | 68 | 27 | | | I | 0.1 | 85 |
| Ex. 46 | Sp nat. gr. A | Mas. art. gr. A | | | 27 | 68 | | | I | 0.1 | 85 |
| Ex. 47 | Sp nat. gr. A | Mas. art. gr. A | Mas. non-gr. Cb. A | | 63 | 22 | 10 | | I | 0.1 | 86 |
| Ex. 48 | Sp nat. gr. A | Mas. art. gr. A | Mas. non-gr. Cb. A | | 22 | 63 | 10 | | I | 0.1 | 86 |
| Ex. 49 | Sp nat. gr. A | Mas. art. gr. A | Mas. non-gr. Cb. A | Fl-like eas. gr. Cb A | 63 | 22 | 5 | 5 | I | 0.1 | 87 |
| Ex. 50 | | Mas. art. gr. A | Mas. non-gr. Cb. A | | | 68 | 27 | | I | 0.1 | 85 |

Ex. = Example
Sp nat. gr. = Spherical natural graphite
Mas. art. gr. = Massive artificial graphite
Mas. non-gr. Cb. = Massive non-graphitizable carbon
Fl-like eas. gr. Cb = Flake-like easily graphitizable carbon

TABLE 7

| Sample | Negative electrode active materials | | | | Mixing proportions of active materials | | | | Additive in electrolyte solution | | Residual capacity ratio (%) |
|---|---|---|---|---|---|---|---|---|---|---|---|
| | First active material | Second active material | Third active material | Fourth active material | First active material (% by mass) | Second active material (% by mass) | Third active material (% by mass) | Fourth active material (% by mass) | Compound type | Content in electrolyte solution (mol/L) | |
| Com.-Ex. 1 | Sp nat. gr. A | | | | 95 | | | | MMDS | 0.1 | 67 |
| Com.-Ex. 2 | | Mas. art. gr. A | | | | 95 | | | MMDS | 0.1 | 68 |
| Com.-Ex. 3 | | | Mas: non-gr. Cb. A | | | | 95 | | MMDS | 0.1 | 66 |
| Com.-Ex. 4 | | | | Fl-like eas. gr. Cb A | | | | 95 | MMDS | 0.1 | 65 |
| Com.-Ex. 5 | Sp nat. gr. A | Mas. art. gr. A | | | 68 | 27 | | | MMDS | 0.1 | 68 |
| Com.-Ex. 6 | Sp nat. gr. A | Mas. art. gr. A | | | 27 | 68 | | | MMDS | 0.1 | 68 |
| Com.-Ex. 7 | Sp nat. gr. A | Mas. art. gr. A | Mas. non-gr. Cb. A | | 63 | 22 | 10 | | MMDS | 0.1 | 68 |
| Com.-Ex. 8 | Sp nat. gr. A | Mas. art. gr. A | Mas. non-gr. Cb. A | Fl-like eas. gr. Cb A | 63 | 22 | 5 | 5 | MMDS | 0.1 | 68 |
| Com.-Ex. 9 | Lithium titanate | | | | 95 | | | | A | 0.1 | 41 |
| Com.-Ex. 10 | Lithium titanate | | | | 95 | | | | E | 0.1 | 43 |
| Com.-Ex. 11 | Lithium titanate | | | | 95 | | | | G | 0.1 | 45 |
| Com.-Ex. 12 | Lithium titanate | | | | 95 | | | | H | 0.1 | 47 |
| Com.-Ex. 13 | Lithium titanate | | | | 95 | | | | I | 0.1 | 48 |
| Com.-Ex. 14 | Silicon | | | | 95 | | | | A | 0.1 | 40 |
| Com.-Ex. 15 | Silicon | | | | 95 | | | | E | 0.1 | 43 |
| Com.-Ex. 16 | Silicon | | | | 95 | | | | G | 0.1 | 45 |

TABLE 7-continued

| | Negative electrode active materials | | | | Mixing proportions of active materials | | | | Additive in electrolyte solution | | |
|---|---|---|---|---|---|---|---|---|---|---|---|
| | | | | | First | Second | Third | Fourth | | Content in | Residual |
| Sample | First active material | Second active material | Third active material | Fourth active material | active material (% by mass) | active material (% by mass) | active material (% by mass) | active material (% by mass)) | Compound type | electrolyte solution (mol/L) | capacity ratio (%) |
| Com.-Ex. 17 | Silicon | | | | 95 | | | | H | 0.1 | 46 |
| Com.-Ex. 18 | Silicon | | | | 95 | | | | I | 0.1 | 48 |

MMDS: Methylene methanedisulfonic acid ester
Com-Ex. = Comparative Example
Sp nat. gr. = Spherical natural graphite
Mas. art. gr. = Massive artificial graphite
Mas. non-gr. Cb. = Massive non-graphitizable carbon
Fl-like eas. gr. Cb = Flake-like easily graphitizable carbon As shown in Tables 2 to 7, the batteries shown in Examples 1 to 50 were verified to be drastically improved in the residual capacity ratio as compared with the batteries in Comparative Examples 1 to 18. In particular, by using Compound I among the compounds as the additives of the present invention, the residual capacity ratio was most highly improved. This is probably because Compound I has a function capable of forming a low-resistance high-quality film on the negative electrode made of the first carbon, the second carbon, the third carbon or the fourth carbon than the cases where methylene methanedisulfonic acid ester were used in Comparative Examples. It has been found that because of this reason, the residual capacity ratio (self-discharge property) can be more improved.

By mixing at least one or more types of the first carbon, the second carbon, the third carbon and the fourth carbon, and by applying the additives A to I of the present invention, while the low-resistance SEI film was being formed on the negative electrode, the conductive path between the active materials was able to be maintained in a low-resistance state. Accordingly, it has been shown that the residual capacity ratio (self-discharge property) is improved.

Moreover, as the reason for the fact that in the compounds of an additive shown in Table 1, used in the present invention, the compound in which one of $R_1$ and $R_2$ is an alkyl group and the other of $R_1$ and $R_2$ is a hydrogen atom is most preferable, there is considered a hypothesis that this preference is due to the degradation of the reactivity with the decomposition product of the supporting electrolyte salt caused by the condition that at least one of $R_1$ and $R_2$ is not a hydrogen atom. It is considered that, accordingly, in particular, the stability of the film formed on the surface of the negative electrode including carbon was involved, and hence the residual capacity ratio (self-discharge property) was able to be drastically improved.

INDUSTRIAL APPLICABILITY

Examples of the application of the present invention include driving devices such as electric vehicles, plug-in hybrid electric vehicles, electric motorcycles and electric power-assisted bicycles; tools such as electric tools; electronic devices such as portable terminals and notebook personal computers; and storage batteries for household electricity storage systems and solar power generation systems.

EXPLANATION OF SYMBOLS

1: positive electrode active material layer
2: negative electrode active material layer
3: positive electrode current collector
4: negative electrode current collector
5: porous separator
6: laminate outer package
7: laminate outer package
8: negative electrode tab
9: positive electrode tab

The invention claimed is:

1. A lithium ion secondary battery comprising:
a negative electrode comprising a negative electrode active material comprising at least two different carbons selected from the group of carbons consisting of natural graphite, artificial graphite, non-graphitizable carbon, and easily graphitizable carbon wherein at least one of the carbons of the negative electrode active material comprises massive non-graphitizable carbon; and
an electrolyte solution comprising a cyclic sulfonic acid ester represented by the following formula (1):

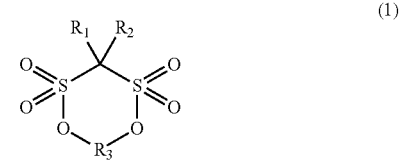

(1)

wherein, in the formula (1), $R_1$ and $R_2$ are each independently a hydrogen atom, an alkyl group having 1 to 5 carbon atoms, a halogen atom or an amino group with the proviso that $R_1$ and $R_2$ are not hydrogen atoms at the same time; $R_3$ represents a linkage group selected from the group consisting of an alkylene group having 1 to 5 carbon atoms, a carbonyl group, a sulfonyl group, a fluoroalkylene group having 1 to 6 carbon atoms, and a divalent group having 2 to 6 carbon atoms in which alkylene units or fluoroalkylene units are bonded through an ether group.

2. The lithium ion secondary battery according to claim 1, wherein at least one of the carbons of the negative electrode active material comprises spherical natural graphite.

3. The lithium ion secondary battery according to claim 1, wherein at least one of the carbons of the negative electrode active material comprises massive artificial graphite.

4. The lithium ion secondary battery according to claim 1, wherein at least one of the carbons of the negative electrode active material comprises flake-like easily graphitizable carbon.

5. The lithium ion secondary battery according to claim 1, wherein in the formula (1), $R_1$ is a hydrogen atom.

6. The lithium ion secondary battery according to claim 1, wherein in the formula (1), $R_1$ is a hydrogen atom and $R_3$ is —$(CH_2)_n$— or —$(CF_2)_n$— (n=an integer of 1 to 5).

7. The lithium ion secondary battery according to claim 1, wherein in the general formula (1), $R_1$ is a hydrogen atom, $R_2$ is —$C_mH_{2m+1}$ (m=1 to 3) and $R_3$ is —$CH_2$—.

8. The lithium ion secondary battery according to claim 1, wherein the electrolyte solution further comprises a compound having one or more sulfonyl groups.

9. The lithium ion secondary battery according to claim 8, wherein the compound having one or more sulfonyl groups is a sultone compound represented by the following formula (2):

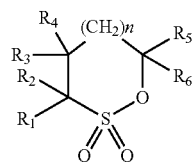

(4)

wherein in the general formula (4), n is an integer of 0 or more and 2 or less; and $R_1$ to $R_6$ are each independently selected from a hydrogen atom, an alkyl group having 1 or more and 12 or less carbon atoms, a cycloalkyl group having 3 or more and 6 or less carbon atoms and an aryl group having 6 or more and 12 or less carbon atoms.

10. The lithium ion secondary battery according to claim 1, wherein the cyclic sulfonic acid ester represented by the formula (1) is comprised in a content of 0.005% by mass or more and 10% by mass or less to the total mass of the electrolyte solution.

11. The lithium ion secondary battery according to claim 1, wherein the electrolyte solution further comprises a vinylene carbonate or a derivative thereof.

12. The lithium ion secondary battery according to claim 1, wherein the electrolyte solution further comprises as a lithium salt, one or more compounds selected from the group consisting of $LiPF_6$, $LiBF_4$, $LiAsF_6$, $LiSbF_6$, $LiClO_4$, $LiAlCl_4$, and $LiN(C_nF_{2n+1}SO_2)(C_mF_{2m+1}SO_2)$ (n and m are natural numbers).

13. The lithium ion secondary battery according to claim 1, wherein at least one of the carbons of the negative electrode active material is selected from the group of carbons consisting of spherical natural graphite, massive artificial graphite, and flake-like easily graphitizable carbon.

14. A method for producing a lithium ion secondary battery having an electrode element, a nonaqueous electrolyte solution and an outer package, the method comprising:
preparing an electrode element by arranging a positive electrode and a negative electrode comprising a negative electrode active material so as to face each other; and
enclosing the electrode element and a nonaqueous electrolyte solution in an outer package,
wherein the nonaqueous electrolyte solution comprises a cyclic sulfonic acid ester represented by formula (1); and
the negative electrode active material comprises at least two different carbons selected from the group of carbons consisting of natural graphite, artificial graphite, non-graphitizable carbon and easily graphitizable carbon, wherein at least one of the carbons of the negative electrode active material comprises massive non-graphitizable carbon;

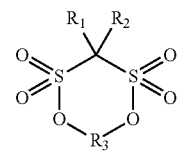

(1)

wherein, in formula (1), $R_1$ and $R_2$ are each independently a hydrogen atom, an alkyl group having 1 to 5 carbon atoms, a halogen atom or an amino group with the proviso that $R_1$ and $R_2$ are not hydrogen atoms at the same time; $R_3$ represents a linkage group selected from the group consisting of an alkylene group having 1 to 5 carbon atoms, a carbonyl group, a sulfonyl group, a fluoroalkylene group having 1 to 6 carbon atoms, and a divalent group having 2 to 6 carbon atoms in which alkylene units or fluoroalkylene units are bonded through an ether group.

* * * * *